May 20, 1924.
J. McGLASHAN
STRAP FASTENER
Filed Jan. 11, 1922
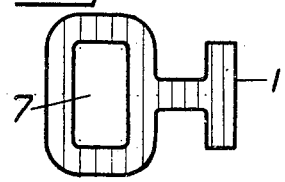
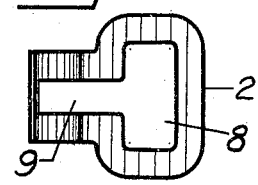
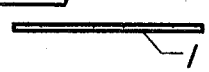
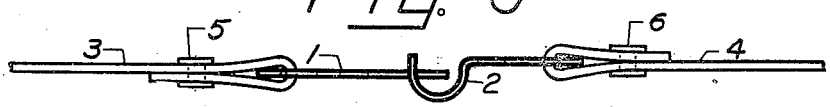
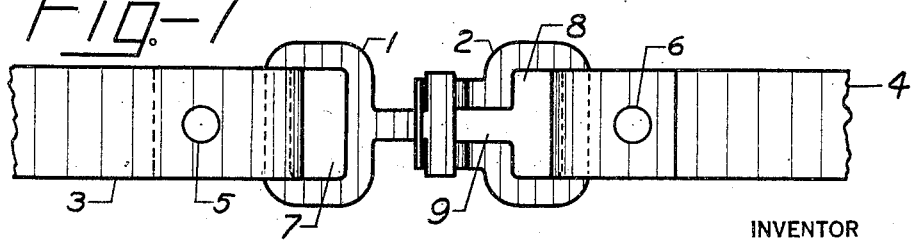
INVENTOR
JAMES McGLASHAN
BY
William Mac Glashan
ATTORNEY Patented May 20, 1924.

1,494,610

UNITED STATES PATENT OFFICE.

JAMES McGLASHAN, OF YORK, PENNSYLVANIA.

STRAP FASTENER.

Application filed January 11, 1922. Serial No. 528,568.

*To all whom it may concern:*

Be it known that I, JAMES McGLASHAN, a subject of George V, King of Great Britain and Ireland, and resident of York, in the county of York and State of Pennsylvania, have invented certain new and useful Improvements in Strap Fasteners, of which the following is a specification.

This invention relates to strap fasteners and the object is to provide such a device that will be simple and economical to produce and will not become inadvertently unfastened while in use.

In the usual design of strap-fastener having a bent member engaging a member having an opening, a sudden slackening of the tension in the straps often caused the two members to become disengaged. It is especially this undesirable feature that I overcome with my present invention.

This design is very simple, consisting of only two parts or pieces which I shall refer to as the hook member and the eye member, both of which can be easily and economically produced by punching out of sheet metal altho other methods and material may be used. The eye member is so formed that when in operative position with the hook member, the hook member is limited in lengthwise movements by two vertical abutments and in up and down movement by two horizontal abutments of the eye member, thus eliminating any possibility of the members becoming inadvertently disengaged while in operative position.

To better describe my invention I will refer to the accompanying drawings in which—

Figure 1 is a top view of the hook member.

Figure 2 is a side view of the hook member.

Figure 3 is a top view of the eye member.

Figure 4 is a side view of the eye member.

Figure 5 is an end view of the eye member.

Figure 6 is a side view of both members in operative position and

Figure 7 is a top view of both members in operative position.

"1" is the hook member consisting of a T-shaped part having a base adaptable for passing a strap therethru as at 7, and being substantially flat. "2" is the eye member having at one end a transverse slot 8, adapted to pass a strap and the T head of the hook member "1" therethru. From this transverse slot 8 runs a longitudinal slot as shown at 9 slightly wider than the body of the T of member 1, the two slots forming a T shaped opening framed by the material from which the device is made.

The end of the member 2 containing the longitudinal slot 9 is formed hook or U shaped as shown in Figure 4, the vertical portions of the hook provided two vertical abutments, the bottom of the hook forming a horizontal abutment, and the closed end of the member 2 at the extremity of the longitudinal slot another horizontal abutment as shown in Figure 5, for the head of the T-shaped member 1 when properly inserted therein. In operation the hook member 1 is held obliquely in relation to the eye member 2, the head is inserted in the transverse slot 8 of the eye member 2 from the underside and passes therethru after which the hook member 1 is pulled towards the hook of the eye member 2, the shank passing thru the longitudinal slot 9 of the eye member 2 with the head of the hook member being above the eye member, until the head of the hook member 1 drops into the hooked end of the eye member 2, thus allowing the two members 1 and 2 to align themselves in substantially parallel planes as shown in Figure 6, bringing the head into proper relationship with the four aforementioned abutments, and preventing inadvertent unfastening of the two members thereafter.

To unhook, the joint between the members is raised up out of the plane of the straps and the above operations are reversed.

As previously stated the straps 3 and 4 are looped thru the slots 7 and 8 respectively, and are held by the rivets 5 and 6.

What I claim is:—

1. A fastener comprising a hook member and an eye member, said hook member comprising an attaching end and a T shaped extending portion, said eye member comprising a frame enclosing a T shaped opening, the head of the T shaped opening adapted to receive a strap, and the end of the eye member adjacent the base of the T being bent to form abutments for limiting up and down movement of the hook member in relation to the eye member and for limiting the endwise movement of the hook member to or from the eye member when said members are in operative engagement.

2. An eye member having a key-hole opening therein, the end of said member embodying the smaller end of said opening being bent downwardly, turning and then bent upwardly into the shape of a hook in elevation; and a hook member consisting of an attaching end and a shank projecting therefrom having two transverse projections at its extremity, said hook member lying wholly in one plane.

3. The combination with a hook member having a T shaped head, of an eye member having sides and ends, one end portion of said eye member being bent downwardly turning horizontally, and then upwardly to a hook shaped form in elevation, said sides being spaced apart to receive said hook member, and the head of said hook member being positioned within the hook of the eye member when in operative position.

4. The combination with a hook member lying wholly in one plane, comprising an attaching portion and shank extending therefrom having at its end two transverse projections, of an eye member comprising a substantially T shaped frame, having its end remote from the head of the T bent downwardly, turning, and then upwardly so as to be substantially U shaped in elevation, in such a manner as to form two vertical abutments, the lower part of said U shaped end forming a horizontal abutment and the extremity of said U shaped end forming another horizontal abutment; said abutments limiting the movement of said hook-member when the same is in operative position with said eye member as described.

5. The combination with a hook member having a substantially T-shaped engaging portion, of an eye member substantially T-shaped in plan view, having the end of the shank remote from the head bent downwardly, turning, and then bent upwardly to a U-shaped form in elevation, and having a T-shaped opening therein conforming in position to the member itself, the shank of said T-shaped opening continuing down the shank of said member to a point near the extremity of the same.

6. The combination with an eye-member composed of a single piece of material formed into an elongated transverse loop, longitudinally extending portions formed therewith, the ends of said longitudinally extending portions opposite the elongated transverse loop being joined and bent hook-shaped to form two substantially vertical abutments, the lower part of said hook-shaped portion forming a horizontal abutment and the joined ends of said longitudinally extending portions forming another horizontal abutment, of a hook member comprising an attaching end and a T shaped portion formed therewith, said T shaped portion adapted to engage the aforementioned abutments.

Signed by me at York, Pennsylvania, U. S. A., this 30th day of Decr., 1921.

JAMES McGLASHAN.

Witnesses:
W. U. MAYES,
BEATRICE BOTT.